United States Patent
Yamashita et al.

(10) Patent No.: US 8,273,500 B2
(45) Date of Patent: Sep. 25, 2012

(54) POLYMER ELECTROLYTE COMPOSITION AND FUEL CELL

(75) Inventors: Yasuhiro Yamashita, Tsukuba (JP); Diazaburo Yashiki, Niihama (JP); Mitsunori Nodono, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 373 days.

(21) Appl. No.: 12/680,119

(22) PCT Filed: Sep. 25, 2008

(86) PCT No.: PCT/JP2008/067876
§ 371 (c)(1), (2), (4) Date: Mar. 25, 2010

(87) PCT Pub. No.: WO2009/041712
PCT Pub. Date: Apr. 2, 2009

(65) Prior Publication Data
US 2010/0196792 A1    Aug. 5, 2010

(30) Foreign Application Priority Data
Sep. 25, 2007   (JP) ................................ 2007-246746

(51) Int. Cl.
*H01M 8/10*  (2006.01)
(52) U.S. Cl. ......... 429/492; 429/479; 429/491; 429/493
(58) Field of Classification Search .................. 429/479, 429/491, 492, 493, 483
See application file for complete search history.

(56) References Cited

U.S. PATENT DOCUMENTS

| | | | |
|---|---|---|---|
| 6,761,989 B2 * | 7/2004 | Terahara et al. ............. | 429/493 |
| 2002/0188097 A1 | 12/2002 | Goto et al. | |
| 2004/0101730 A1 | 5/2004 | Hirano et al. | |
| 2008/0027151 A1 * | 1/2008 | Maier et al. ..................... | 521/25 |
| 2009/0253015 A1 | 10/2009 | Onodera et al. | |

FOREIGN PATENT DOCUMENTS

| | | |
|---|---|---|
| EP | 1 394 879 A1 | 3/2004 |
| JP | 06-231778 A | 8/1994 |
| JP | 2003-31232 A | 1/2003 |
| JP | 2003-113136 A | 4/2003 |
| JP | 2005-220193 A | 8/2005 |
| JP | 2007-177197 A | 7/2007 |
| JP | 2008-053084 A | 3/2008 |
| JP | 2008-166050 A | 7/2008 |
| JP | 2008-269884 A | 11/2008 |
| WO | WO 2007/086309 A1 | 8/2007 |

OTHER PUBLICATIONS

Supplementary European Search Report issued Nov. 25, 2011 in European Application No.08832851.3.

* cited by examiner

*Primary Examiner* — Roy King
*Assistant Examiner* — Carlos Barcena
(74) *Attorney, Agent, or Firm* — Sughrue Mion, PLLC

(57) ABSTRACT

A polymer electrolyte composition obtained by mixing a plurality of ion-conductive polymers, wherein if the ion-conductive polymer that is highest in ion exchange capacity among the plurality of ion-conductive polymers is termed first ion-conductive polymer, and the ion-conductive polymer that is lowest in ion exchange capacity is termed second ion-conductive polymer, then the first ion-conductive polymer and the second ion-conductive polymer are both block copolymers composed of a segment having an ion-exchange group and a segment having substantially no ion-exchange groups, and if the weight fraction of the segment having an ion-exchange group in the first ion-conductive polymer is termed Wh1, and the weight fraction of the segment having an ion-exchange group in the second ion-conductive polymer is termed Wh2, then the relations (I) and (II) listed below are satisfied: (I) Wh1>Wh2; (II) Wh1−Wh2≦0.25.

18 Claims, No Drawings

POLYMER ELECTROLYTE COMPOSITION AND FUEL CELL

TECHNICAL FIELD

The present invention relates to a polymer electrolyte composition and a solid polymer fuel cell that is produced using the polymer electrolyte composition.

BACKGROUND ART

Solid polymer fuel cells (hereinafter sometimes referred to as "fuel cells") are electric power generation devices that generate electrical power via a chemical reaction between hydrogen and oxygen, and hold great promise as a possible next generation energy source in fields such as the electrical equipment industry and the automotive industry. With respect to the polymer electrolyte membrane within these fuel cells, there has recently been attention to hydrocarbon-based polymer electrolytes, which are inexpensive and exhibit excellent heat resistance, in place of conventional fluorine-based polymer electrolytes.

As the hydrocarbon-based polymer electrolyte, if an ion-conductive polymer is used that is capable of forming a polymer electrolyte membrane in which a polymer segment having an ion-conductive component and a polymer segment having no ion-conductive component have exhibited microphase separation, then in the polymer electrolyte membrane, the polymer segment having an ion-conductive component has preferable properties, including forming a favorable ion conduction path to exhibit excellent ion conductivity, accordingly, investigations have focused mainly on the development of block copolymers having these two types of segments (for example, see JP-2003-31232-A, JP-2007-177197-A, and JP-2003-113136-A).

Examples of known methods of producing these types of ion-conductive polymers include a method in which a block copolymer composed of a segment having a site at which an ion-exchange group can be introduced and a segment having no such sites is first produced, and an ion-exchange group is then introduced into the block copolymer at the site at which an ion-exchange group can be introduced, a method in which a segment precursor having an ion-exchange group and a segment precursor having substantially no ion-exchange groups are both prepared, and the two segment precursors are then linked together to produce a block copolymer, and a method in which a monomer having an ion-exchange group is subjected to sequential polymerization with a segment precursor having substantially no ion-exchange groups to produce a block copolymer.

However, for an industrially produced block copolymer, producing a copolymer having substantially uniform properties in a stable manner is extremely difficult, which may act as obstacles from a quality control perspective. Accordingly, a series of cumbersome operations has conventionally been required in which, for example, fuel cell polymer electrolyte membranes are formed one by one from the ion-conductive polymers from various different production lots, the properties of the produced membranes are evaluated, and those ion-conductive polymers that would yield the required properties are then selected.

Further, in a different aspect, JP-2005-220193-A discloses an attempt to improve the properties of a polymer electrolyte membrane for a fuel cell (a proton conduction membrane) by mixing block copolymers that contain same structural units but have largely different ion-exchange capacities. However, there have been no previous reports of producing a fuel cell polymer electrolyte of stable quality by mixing a plurality of varieties of block copolymer.

DISCLOSURE OF INVENTION

In light of these circumstances, objects of the present invention is to provide a polymer electrolyte composition that enables quality stabilization to be achieved easily during industrial production of a polymer electrolyte membrane for a fuel cell, and also to provide a fuel cell obtained from such a polymer electrolyte composition.

As a result of intensive investigation aimed at achieving the above objects, the inventors of the present invention were able to complete the present invention. In other words, the present invention provides the following [1].

[1] A polymer electrolyte composition obtained by mixing a plurality of ion-conductive polymers, wherein if the ion-conductive polymer that is highest in ion exchange capacity among the plurality of ion-conductive polymers is termed first ion-conductive polymer, and the ion-conductive polymer that is lowest in ion exchange capacity is termed second ion-conductive polymer, then the first ion-conductive polymer and the second ion-conductive polymer are both block copolymers composed of a segment having an ion-exchange group and a segment having substantially no ion-exchange groups, and if the weight fraction of the segment having an ion-exchange group in the first ion-conductive polymer is termed Wh1, and the weight fraction of the segment having an ion-exchange group in the second ion-conductive polymer is termed Wh2, then the relations (I) and (II) listed below are satisfied.

$$Wh1 > Wh2 \quad (I)$$

$$Wh1 - Wh2 \leq 0.25 \quad (II)$$

Moreover, the present invention also provides the following [2] to [11], as preferred embodiments relating to above-mentioned [1].

[2] The polymer electrolyte composition according to [1], wherein the relations (III) and (IV) below are also satisfied:

$$0.10 \leq Wh1 \leq 0.65 \quad (III)$$

$$0.05 \leq Wh2 \leq 0.55 \quad (IV)$$

[3] The polymer electrolyte composition according to [1] or [2], wherein the segment having an ion-exchange group in the first ion-conductive polymer and the segment having an ion-exchange group in the second ion-conductive polymer are formed of the same structural unit.

[4] The polymer electrolyte composition according to any one of [1] to [3], wherein the segment having substantially no ion-exchange groups in the first ion-conductive polymer and the segment having substantially no ion-exchange groups in the second ion-conductive polymer are formed of the same structural unit.

[5] The polymer electrolyte composition according to any one of [1] to [4], wherein the difference between the ion exchange capacity of the first ion-conductive polymer and the ion exchange capacity of the second ion-conductive polymer is from 0.05 to 1.5 meq/g.

[6] The polymer electrolyte composition according to any one of [1] to [5], wherein the ion exchange capacity of the first ion-conductive polymer and the ion exchange capacity of the second ion-conductive polymer are both within a range of from 0.5 to 4.0 meq/g.

[7] The polymer electrolyte composition according to any one of [1] to [6], wherein if the polystyrene-equivalent number average molecular weights of the first ion-conductive polymer and the second ion-conductive polymer, as determined by gel permeation chromatography, are termed Mn1 and Mn2 respectively, then Mn1/Mn2 is within a range of from 0.1 to 10.

[8] The polymer electrolyte composition according to any one of [1] to [7], wherein if the weight fractions of the first ion-conductive polymer and the second ion-conductive polymer within the polymer electrolyte composition are termed W1 and W2 respectively, then W1/W2 is within a range of from 95/5 to 5/95.

[9] The polymer electrolyte composition according to any one of [1] to [8], wherein the first ion-conductive polymer and/or the second ion-conductive polymer is an aromatic polymer.

[10] The polymer electrolyte composition according to any one of [1] to [9], wherein the segment having an ion-exchange group in the first ion-conductive polymer and/or the segment having an ion-exchange group in the second ion-conductive polymer has an aromatic ring in the main chain of the segment and may also have a side chain containing an aromatic ring, and at least one of the aromatic ring in the main chain or the aromatic ring in the side chain is an aromatic ring to which an ion-exchange group is bonded directly.

[11] The polymer electrolyte composition according to any one of [1] to [10], wherein the first ion-conductive polymer and/or the second ion-conductive polymer is a block copolymer containing:

a segment having an ion-exchange group represented by formula (1a), formula (2a), formula (3a) or formula (4a) below:

 (1a)

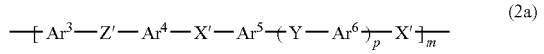 (2a)

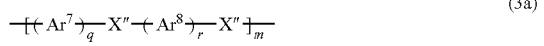 (3a)

 (4a)

wherein m represents an integer of 5 or greater, $Ar^1$ to $Ar^9$ each independently represents a divalent aromatic group which has an aromatic ring in the main chain and may also have a side chain containing an aromatic ring, and in which an ion-exchange group is bonded directly to at least one of the aromatic ring in the main chain or the aromatic ring in the side chain, Z and Z' each independently represents CO or $SO_2$, X, X' and X" each independently represents O or S, Y represents a direct bond or a group represented by formula (10) below, p represents 0, 1 or 2, q and r each independently represents 1, 2 or 3, and m represents the polymerization degree of the segment, and a segment having substantially no ion-exchange groups represented by formula (1b), formula (2b), formula (3b) or formula (4b) below:

 (1b)

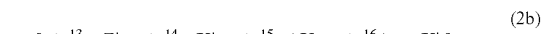 (2b)

 (3b)

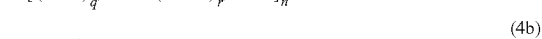 (4b)

wherein n represents an integer of 5 or greater, $Ar^{11}$ to $Ar^{19}$ each independently represents a divalent aromatic group that may have a substituent as a side chain, Z and Z' each independently represents CO or $SO_2$, X, X' and X" each independently represents O or S, Y represents a direct bond or a group represented by general formula (10) below, p' represents 0, 1 or 2, and q' and r' each independently represents 1, 2 or 3,

 (10)

wherein $R^a$ and $R^b$ each independently represents a hydrogen atom, an alkyl group of 1 to 10 carbon atoms that may have a substituent, an alkoxy group of 1 to 10 carbon atoms that may have a substituent, an aryl group of 6 to 18 carbon atoms that may have a substituent, an aryloxy group of 6 to 18 carbon atoms that may have a substituent, or an acyl group of 2 to 20 carbon atoms that may have a substituent, and $R^a$ and $R^b$ may be linked to form a ring.

[12] The polymer electrolyte composition according to any one of [1] to [11], wherein the ion-exchange group being within the first ion-conductive polymer and/or the second ion-conductive polymer is sulfonic acid group.

The polymer electrolyte composition of the present invention is extremely useful in producing a fuel cell member such as a fuel cell polymer electrolyte membrane of stable quality, and the present invention also provides the following [13] to [18].

[13] A polymer electrolyte membrane, formed from the polymer electrolyte composition according to any one of [1] to [12].

[14] The polymer electrolyte membrane according to [13], having a microphase-separated structure comprising a phase in which the density of the segment having an ion-exchange group is higher than the density of the segment having substantially no ion-exchange groups, and a phase in which the density of the segment having substantially no ion-exchange groups is higher than the density of the segment having an ion-exchange group.

[15] A membrane-electrode assembly, comprising the polymer electrolyte membrane according to [13] or [14].

[16] A catalyst layer, formed from the polymer electrolyte composition according to any one of [1] to [12].

[17] A membrane-electrode assembly, comprising the catalyst layer according to [16].

[18] A solid polymer fuel cell, comprising the membrane-electrode assembly according to [15] or [17].

BEST MODE FOR CARRYING OUT THE INVENTION

A detailed description of preferred embodiments of the present invention is presented below.

<Ion-Conductive Polymers>

The first ion-conductive polymer and the second ion-conductive polymer used in the present invention are both block copolymers composed of a segment having an ion-exchange group and a segment having substantially no ion-exchange groups, and among the plurality of ion-conductive polymers used in the production of the above polymer electrolyte composition, the first ion-conductive polymer is the ion-conductive polymer having the highest ion exchange capacity, and the second ion-conductive polymer is the ion-conductive polymer having the lowest ion exchange capacity.

Here, the "segment having an ion-exchange group" means a segment which contains an average of at least 0.5 ion-exchange groups per structural unit, and which preferably contains an average of at least 1.0 ion-exchange groups per structural unit.

On the other hand, the "segment having substantially no ion-exchange groups" means a segment which contains an average of not more than 0.1 ion-exchange groups per structural unit, and which preferably contains an average of not more than 0.05 ion-exchange groups per structural unit.

In the following description, the first ion-conductive polymer and the second ion-conductive polymer may collectively be referred to as "the two ion-conductive polymers".

The polymer electrolyte composition of the present invention is characterized in that in the two ion-conductive polymers, if the weight fraction of the segment having an ion-exchange group in the first ion-conductive polymer is termed Wh1, and the weight fraction of the segment having an ion-exchange group in the second ion-conductive polymer is termed Wh2, then the relations (I) and (II) listed above are satisfied.

In this description, the weight fraction of the segment having an ion-exchange group within the first ion-conductive polymer refers to the ratio of the weight of the segment having an ion-exchange group relative to the total weight of the first ion-conductive polymer, and in those cases where the first ion-conductive polymer contains a plurality of segments having an ion-exchange group, refers to the ratio of those combined weight relative to the total weight of the first ion-conductive polymer. The weight fraction of the segment having an ion-exchange group within the second ion-conductive polymer is similarly defined.

In the relation represented by (II) above, Wh1−Wh2 is preferably not more than 0.20, more preferably not more than 0.15, still more preferably not more than 0.10, and most preferably not more than 0.07.

Wh1 and Wh2, namely the weight fractions of the segment having an ion-exchange group within the two ion-conductive polymers, are preferably close in value, as this enables quality stabilization of a fuel cell member such as a polymer electrolyte membrane to be achieved relatively easily.

Further, the values of the weight fractions Wh1 and Wh2 of the two ion-conductive polymers preferably also satisfy (III) and (IV) above respectively.

In (III), Wh1 is preferably not less than 0.20 and not more than 0.55, more preferably not less than 0.30 and not more than 0.50, still more preferably not less than 0.32 and not more than 0.48, and most preferably not less than 0.34 and not more than 0.46.

On the other hand, in (IV), Wh2 is preferably not less than 0.20 and not more than 0.50, more preferably not less than 0.25 and not more than 0.48, still more preferably not less than 0.28 and not more than 0.46, and most preferably not less than 0.30 and not more than 0.40.

Ensuring that Wh1 and Wh2 satisfy (III) and (IV) above offers the advantages that, in addition to the quality stabilization of the fuel cell polymer electrolyte membrane, the fuel cell member such as the polymer electrolyte membrane develops a practically applicable level of ion conductivity, and also exhibits a favorable degree of water resistance.

The weight fraction of the segment having an ion-exchange group in an ion-conductive polymer may be calculated by first determining the structural unit that constitutes the segment, using that structural unit to calculate the ion exchange capacity of the segment having an ion-exchange group, and then calculating the weight fraction from the ratio between this ion exchange capacity of the segment itself and the ion exchange capacity of the ion-conductive polymer.

The structural unit that constitutes the segment having an ion-exchange group may be ascertained on the basis of the raw material used in producing the segment, or may be determined by analyzing the ion-conductive polymer using various conventional analysis techniques such as nuclear magnetic resonance spectroscopy (NMR), mass spectrometry (MS) and infrared spectroscopy (IR). Moreover, if the segment having substantially no ion-exchange groups can be selectively decomposed by chemical decomposition or thermal decomposition prior to use of the above conventional analysis techniques, then identification of the structural unit that constitutes the segment having an ion-exchange group can be further eased.

The weight fraction Wh (Wh1 or Wh2) of the segment having an ion-exchange group within an ion-conductive polymer (the first ion-conductive polymer or the second ion-conductive polymer) used in the present invention may be determined in the manner described below. First, the ion exchange capacity Ia of the ion-conductive polymer (block copolymer) is determined. Next, supposing a polymer composed solely of the segment having an ion-exchange group, which would be obtained when the segment having substantially no ion-exchange groups were removed from the block copolymer, the ion exchange capacity Ib of this polymer is calculated from the structural unit that constitutes the polymer (namely, the structural unit that constitutes the segment having an ion-exchange group). Then, using these values Ia and Ib, the formula below is used to calculate the weight fraction Wh of the segment having an ion-exchange group within the block copolymer. The structural unit that constitutes the segment having an ion-exchange group may be determined from the raw material that gives rise to the segment having an ion-exchange group in the production of the ion-conductive polymer described below.

$$\text{Weight fraction } Wh = A/B$$

In the ion-conductive polymer, in those cases where the segment having an ion-exchange group and the segment having no ion-exchange groups are bonded together via a linking group, the linking group is deemed to belong to the segment having no ion-exchange groups.

Further, the two ion-conductive polymers in which the structural units that constitute the segments having an ion-exchange group are mutually the same are preferable.

The expression that the structural units that constitute these segments are mutually the same means that, for example, if the segment having an ion-exchange group within the first ion-conductive polymer is formed from a structural unit A, then the segment having an ion-exchange group within the second ion-conductive polymer is also formed from the structural unit A. Furthermore, it also means that if the segment having an ion-exchange group in the first ion-conductive polymer is formed from a structural unit A1 and a structural unit A2, then the segment having an ion-exchange group in the second ion-conductive polymer is also formed from the structural unit A1 and the structural unit A2. In this case, the structural unit A1 and the structural unit A2 need not necessarily both have an ion-exchange group, provided that the number of ion-exchange groups per structural unit that constitutes the segment having an ion-exchange group satisfies the range described above.

Furthermore, in another aspect of the present invention, the two ion-conductive polymers in which the structural units that constitute the segments having substantially no ion-exchange groups are mutually the same are preferable.

The expression that the structural units that constitute these segments are mutually the same means that, for example, if the segment having substantially no ion-exchange groups in the first ion-conductive polymer is formed from a structural unit B, then the segment having substantially no ion-exchange groups within the second ion-conductive polymer is also formed from the structural unit B. Furthermore, it also means that if the segment having substantially no ion-exchange groups within the first ion-conductive polymer is formed from a structural unit B1 and a structural unit B2, then the segment having substantially no ion-exchange groups within the second ion-conductive polymer is also formed from the structural unit B1 and the structural unit B2. In this case, the structural unit B1 and the structural unit B2 need not necessarily both have no ion-exchange groups, provided that the number of ion-exchange groups per structural unit that constitutes the segment having substantially no ion-exchange groups satisfies the range described above.

As mentioned above, the first ion-conductive polymer and the second ion-conductive polymer have mutually different ion exchange capacities (hereinafter referred to as "IEC"), and for the two ion-conductive polymers, the difference between the IEC of the first ion-conductive polymer and the IEC of the second ion-conductive polymer is preferably from 0.05 to 1.5 meq/g, more preferably from 0.05 to 1.0 meq/g, and still more preferably from 0.1 to 0.5 meq/g.

The IEC values for the first ion-conductive polymer and the second ion-conductive polymer are both preferably within a range from 0.5 meq/g to 4.0 meq/g, and more preferably from 1.0 meq/g to 3.0 meq/g. Provided that the IEC values for the two ion-conductive polymers are both within the above range, higher levels of ion conductivity and water resistance can be achieved when a fuel cell polymer electrolyte membrane is produced from the polymer electrolyte composition.

When producing an ion-conductive polymer, by ensuring that the IEC satisfies the above range, the values of Wh1 for the first ion-conductive polymer and Wh2 for the second ion-conductive polymer are able to satisfy the above relations (III) and (IV) respectively.

Furthermore, when producing a polymer electrolyte membrane from the polymer electrolyte composition of the present invention, from the viewpoint of achieving superior heat resistance for the membrane, the first ion-conductive polymer or the second ion-conductive polymer is preferably an aromatic polymer, and those cases where the two ion-conductive polymers are both aromatic polymers are particularly preferable. Here, the "aromatic polymer" is a polymer in which the two segments that constitute the ion-conductive polymer both contain aromatic groups that are bonded together directly to form the main chain, both contain aromatic groups that are bonded together via a suitable atom or group of atoms to form the main chain, or both contain aromatic groups that are bonded via a combination of the above two options. Typical examples of the atom or group of atoms that bonds the segments mutually together include divalent groups such as divalent aromatic groups, an oxygen atom, a sulfur atom, a carbonyl group, a sulfonyl group, or a combination thereof. Examples of preferred aromatic polymers are described below.

In those cases where the two ion-conductive polymers used in the present invention are aromatic polymers, it is preferable that the segment having an ion-exchange group has an aromatic ring in the main chain of the segment, and may also have a side chain containing an aromatic ring, wherein at least one of the aromatic ring in the main chain or the aromatic ring in the side chain is an aromatic ring to which an ion-exchange group is bonded directly. The applicant found that this type of aromatic polymer (electrolyte) having an ion-exchange group bonded directly to an aromatic ring exhibits excellent ion conductivity, and reported in JP-2007-177197-A.

The ion-exchange group may be either a cation exchange group or an anion exchange group, but it is preferably a cation exchange group such as a sulfonic acid group (—$SO_3H$), carboxyl group (—COOH), phosphoric acid group (—OP(O)(OH)$_2$), phosphonic acid group (—P(O)(OH)$_2$) or sulfonylimide group (—$SO_2$—NH—$SO_2$—), and those cases where the two ion-conductive polymers both contain a cation-exchange group selected from among the above groups are preferable. The first ion-conductive polymer and the second ion-conductive polymer may contain different cation-exchange groups, but preferably contain the same cation-exchange group. Moreover, in a fuel cell member, because the two ion-conductive polymers are mainly responsible for the ion conductivity of the member, the ion-exchange group is preferably a strongly acidic cation exchange group, and among the examples listed above, is preferably sulfonic acid group or sulfonylimide group, and particularly preferably sulfonic acid group. Although some or all of the cation exchange groups may form salts by being ion-exchanged with metal ions or the like, substantially all of the cation exchange groups preferably exist in a free acid form, and ensuring such a form tends to facilitate the production of the polymer electrolyte composition. Further, from the viewpoint of using the composition as a fuel cell polymer electrolyte membrane or the like, it is preferable that the cation exchange groups of the two ion-conductive polymers exist substantially entirely in a free acid form.

The two ion-conductive polymers are preferably both hydrocarbon-based ion-conductive polymers in which the halogen atom content, reported as an element weight ratio, is not more than 15% by weight. Compared with conventional widely-used fluorine-based ion-conductive polymers (fluorine-based polymer electrolytes), these hydrocarbon-based ion-conductive polymers offer the advantages of being inexpensive and exhibiting excellent heat resistance. More preferable hydrocarbon-based ion-conductive polymer is a polymer that contains substantially no halogen atoms, and such type of hydrocarbon-based ion-conductive polymer does not have fear of generating a hydrogen halide, during operation of the fuel cell, and corroding other members.

More specifically, examples of the two ion-conductive polymers used in the present invention include an ion-conductive polymer that comprises a segment represented by the aforementioned formula (1a), formula (2a), formula (3a) or formula (4a) [hereinafter sometimes referred to as "formulas (1a) to (4a)"] as the segment having an ion-exchange group, and a segment represented by the aforementioned formula (1b), formula (2b), formula (3b) or formula (4b) [hereinafter sometimes referred to as "formulas (1b) to (4b)"] as the segment having substantially no ion-exchange groups.

In formulas (1a) to (4a), $Ar^1$ to $Ar^9$ represent divalent aromatic groups. Examples of these divalent aromatic groups include divalent monocyclic aromatic groups such as 1,3-phenylene and 1,4-phenylene, divalent condensed ring aromatic groups such as 1,3-naphthalenediyl, 1,4-naphthalenediyl, 1,5-naphthalenediyl, 1,6-naphthalenediyl, 1,7-naphthalenediyl, 2,6-naphthalenediyl and 2,7-naphthalenediyl, and hetero aromatic groups such as pyridinediyl, quinoxalinediyl and thiophenediyl. A divalent monocyclic aromatic group is preferred.

Further, $Ar^1$ to $Ar^9$ may each be substituted with an alkyl group of 1 to 10 carbon atoms that may have a substituent, an alkoxy group of 1 to 10 carbon atoms that may have a substituent, an aryl group of 6 to 18 carbon atoms that may have a substituent, an aryloxy group of 6 to 18 carbon atoms that may have a substituent, or an acyl group of 2 to 20 carbon atoms that may have a substituent.

In $Ar^1$ and/or $Ar^2$ within the structural unit that constitutes the segment of formula (1a), in at least one of $Ar^1$ to $Ar^3$ within the structural unit that constitutes the segment of formula (2a), in $Ar^7$ and/or $Ar^8$ within the structural unit that constitutes the segment of formula (3a), and in $Ar^9$ within the structural unit that constitutes the segment of formula (4a), the aromatic ring(s) that constitute the main chain contain at least one ion-exchange group. As described above, the ion-exchange group is preferably a cation-exchange group, and is more preferably sulfonic acid group.

$Ar^{11}$ to $Ar^{19}$ in formulas (1b) to (4b) each represents a divalent aromatic group. Examples of these divalent aromatic groups include divalent monocyclic aromatic groups such as 1,3-phenylene and 1,4-phenylene, divalent condensed ring aromatic groups such as 1,3-naphthalenediyl, 1,4-naphthalenediyl, 1,5-naphthalenediyl, 1,6-naphthalenediyl, 1,7-naphthalenediyl, 2,6-naphthalenediyl and 2,7-naphthalenediyl, and hetero aromatic groups such as pyridinediyl, quinoxalinediyl and thiophenediyl. A divalent monocyclic aromatic group is preferred.

Furthermore, these divalent aromatic groups may have a substituent. Details relating to this substituent are as described above for $Ar^1$ to $Ar^9$.

The two ion-conductive polymers used in the present invention are block copolymers capable of forming the type of polymer electrolyte membrane having a microphase-separated structure described below. Here, it corresponds to the concept that the block copolymer includes both block copolymers in which the segment having an ion-exchange group and the segment having substantially no ion-exchange groups are either bonded together directly or bonded together via a suitable atom or group of atoms to form the main chain, and graft copolymers in which one of the segments functions as the trunk portion of the copolymer and the other segment functions as a branch portion. However, if ease of production is also taken into consideration, then the former type of block copolymer is preferred. Examples of segment combinations in preferred block copolymers include those combinations listed below in Table 1. Of these, (b), (c), (d), (g) and (h) are preferable, and (g) and (h) are particularly preferable.

TABLE 1

| Block copolymer | Segment having an ion-exchange group | Segment having substantially no ion-exchange groups |
|---|---|---|
| (a) | formula (1a) | formula (1b) |
| (b) | formula (1a) | formula (2b) |
| (c) | formula (2a) | formula (1b) |
| (d) | formula (2a) | formula (2b) |
| (e) | formula (3a) | formula (1b) |
| (f) | formula (3a) | formula (2b) |
| (g) | formula (4a) | formula (1b) |
| (h) | formula (4a) | formula (2b) |

Furthermore, in the above block copolymers, the number of repetitions m of the structural unit in the formulas (1a) to (4a) representing the segment having an ion-exchange group, and the number of repetitions n of the structural unit in the formulas (1b) to (4b) representing the segment having substantially no ion-exchange groups, each represents an integer of 5 or greater. n and m are preferably within a range of from 5 to 1,000, and more preferably a range of from 10 to 500. Block copolymers in which the numbers of repetitions satisfy the above range exhibit excellent balance between the ion conductivity and the mechanical strength and/or water resistance, and are preferred since production of each of the segments is itself easy.

Specifically, examples of preferable block copolymers include block copolymers that comprises a segment (the segment having an ion-exchange group) containing one or two or more structural units selected from among the structural units having an ion-exchange group shown below, and a segment (the segment having substantially no ion-exchange groups) containing one or two or more structural units selected from among the structural units having no ion-exchange groups shown below. The two segments may be bonded together directly, or may be linked via a suitable atom or group of atoms. Examples of the atom or group of atoms that may be used for linking the segments are the same as those illustrated above.

(Structural Units Having an Ion-Exchange Group)

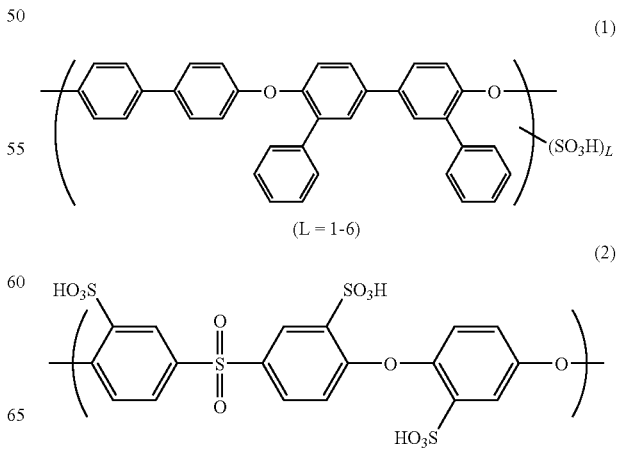

-continued
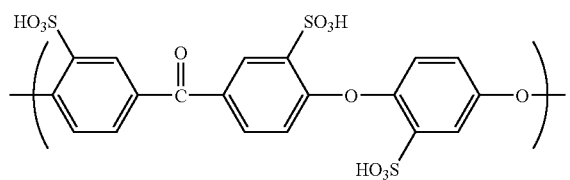 (3)
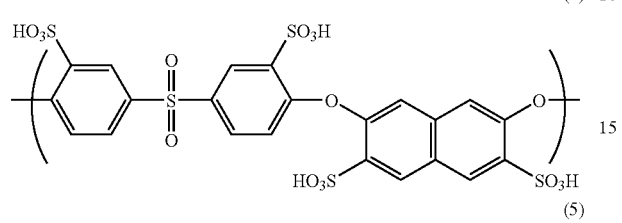 (4)
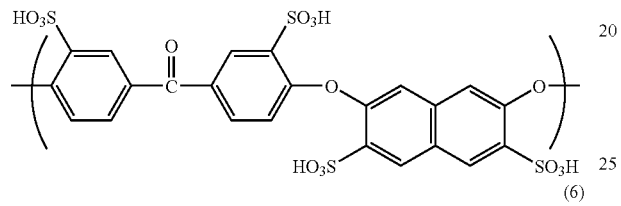 (5)
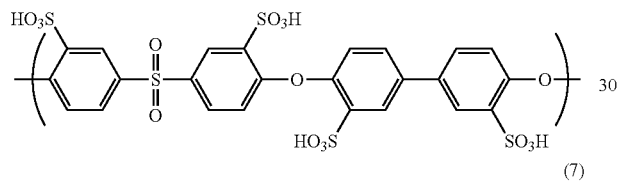 (6)
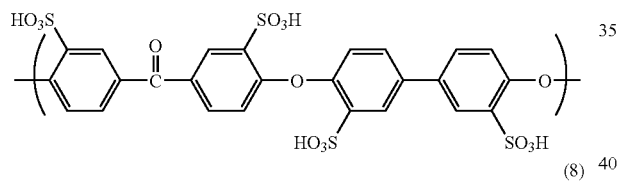 (7)
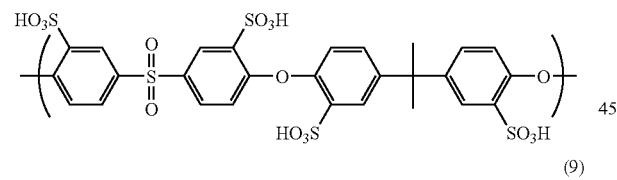 (8)
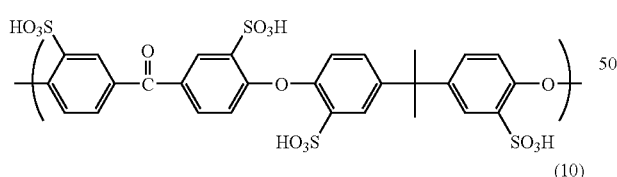 (9)
 (10)
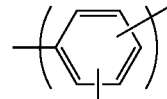
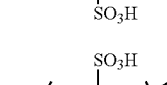
 (11)
(Structural Units Having No Ion-Exchange Groups)
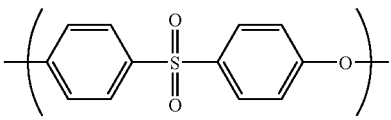 (12)
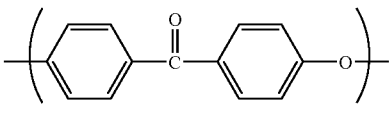 (13)
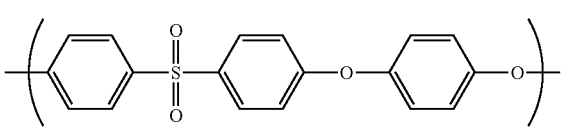 (14)
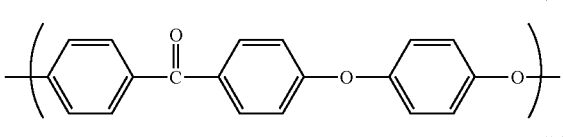 (15)
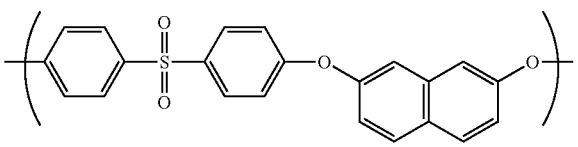 (16)
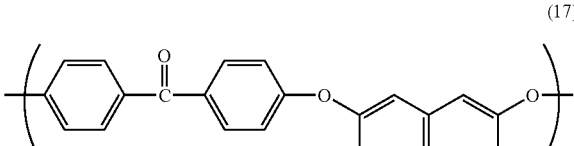 (17)
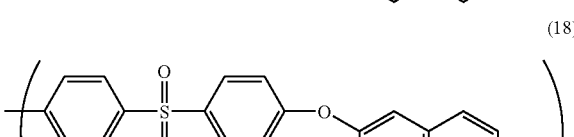 (18)
 (19)
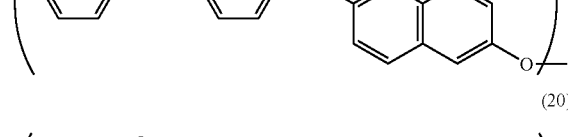 (20)
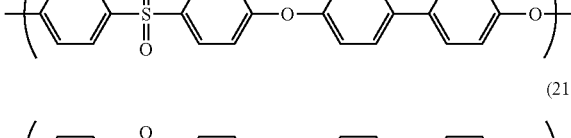 (21)
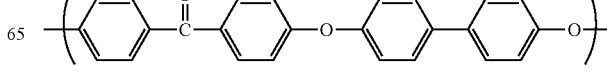

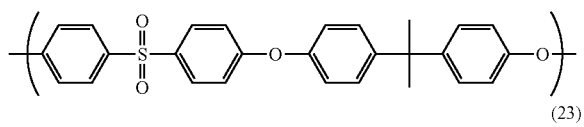

(22)

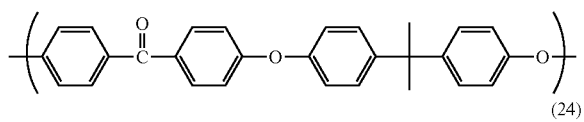

(23)

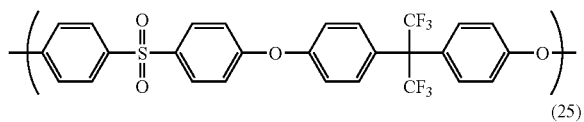

(24)

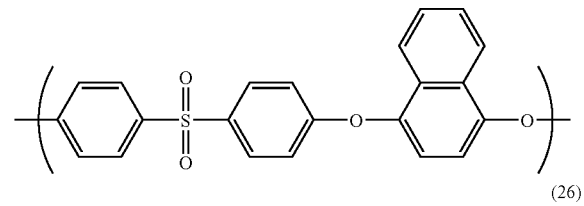

(25)

(26)

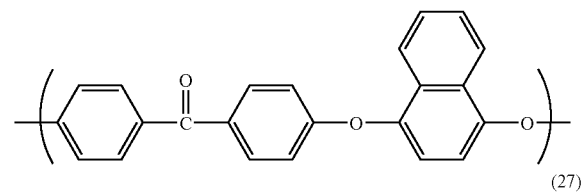

(27)

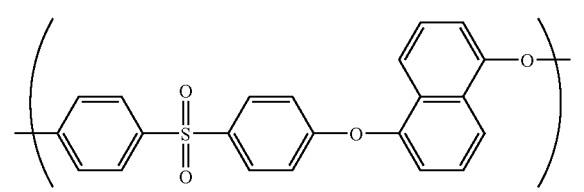

(28)

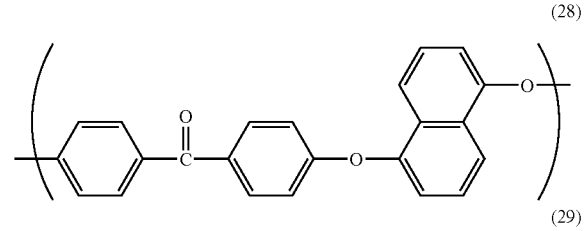

(29)

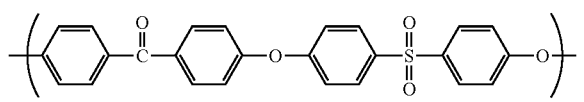

Within the examples outlined above, the structural unit that constitutes the segment having an ion-exchange group is preferably one or more structural units selected from the group consisting of the units (2), (10) and (11), and of these, is particularly preferably (10) and/or (11). A polymer electrolyte comprising the segment containing such structural unit is able to provide superior ion conductivity, and because the segment forms a polyarylene structure, the chemical stability also tends to be relatively good. The structural unit that constitutes the segment having no ion-exchange groups is preferably one or more structural units selected from the group consisting of (12), (14), (16), (18), (20) and (22). A polymer electrolyte comprising the segment containing such structural unit is able to provide superior dimensional stability.

The molecular weights of the two ion-conductive polymers, reported as polystyrene-equivalent number average molecular weights determined by GPC (gel permeation chromatography), are both preferably from 5,000 to 1,000,000, and particularly preferably from 15,000 to 400,000.

Furthermore, if the polystyrene-equivalent number average molecular weights of the first ion-conductive polymer and the second ion-conductive polymer are termed Mn1 and Mn2 respectively, then the value of Mn1/Mn2 is preferably within a range of from 0.1 to 10, and more preferably from 0.2 to 5. In this manner, using two ion-conductive polymers that have relatively approximate molecular weights offers the advantage that the two ion-conductive polymers exhibit more superior compatibility with each other.

In the polymer electrolyte composition of the present invention, if the weight fractions of the first ion-conductive polymer and the second ion-conductive polymer are termed W1 and W2 respectively, then W1/W2 is preferably within a range of from 95/5 to 5/95. If the blend ratio between the two ion-conductive polymers satisfies this range, then not only is production of the polymer electrolyte composition made easier, but quality stabilization of the fuel cell member obtained from the polymer electrolyte composition can also be achieved more readily.

Such polymers as the two ion-conductive polymers used in the present invention can be produced on the basis of conventional production methods while ensuring that the weight fractions of the segments having an ion-exchange group in each of the ion-conductive polymers satisfy the relations (I) and (II) described above, and preferably satisfy the relations (I) to (IV) described above. For example, according to the block copolymer production methods disclosed in JP-2005-126684-A and JP-2005-139432-A, and the block copolymer production method disclosed by the applicants of the present invention in JP-2007-177197-A, various kinds of different ion-conductive polymers can be produced. By reference to the block copolymer production methods disclosed in the above publications, a method of producing an ion-conductive polymer according to the present invention is described below.

According to the block copolymer production methods disclosed in JP-2005-126684-A and JP-2005-139432-A, it is disclosed a method in which a precursor polymer that gives rise to a block (segment) having an ion-exchange group and a precursor polymer that gives rise to a block (segment) having no ion-exchange groups are prepared independently, and these two precursor polymers are then bonded together to produce a block copolymer. In this method, if leaving groups are provided at both terminals of one of the precursor polymers, and nucleophilic groups are provided at both terminals of the other precursor polymer, then the precursor polymers can be bonded together via a nucleophilic reaction between the leaving groups and the nucleophilic groups, thereby generating a block copolymer (block copolymer production method A). Also, if the two precursor polymers are both prepared with nucleophilic groups at both terminals, and a low-molecular weight compound having a plurality of leaving groups (such as perfluorobiphenyl and perfluorobenzene) is used as a linking agent to link the two precursor polymers together, then a block copolymer containing a linking agent residue such as perfluorophenylene group and perfluorobiphenylenediyl group can be produced (block copolymer production method B). In the production of the block copolymer, the two block copolymers (ion-conductive polymers) can be produced with the relations (III) or (IV) described above being satisfied. Specifically, the two block copolymers (ion conductive polymers) are produced using the respective midpoint values of the weight fraction ranges represented by (III) and (IV) above as a guide. In other words, one of the block copolymers (the first ion-conductive polymer) is produced so that Wh1 will be approximately 0.38, and the other block copolymer (the second ion-conductive polymer) is produced so that Wh2 will be approximately 0.3. To produce each of the two block copolymers, the blend weight ratio between the two precursor polymers in the above block copolymer production method A, or the blend weight ratio between the two precursor polymers and the weight ratio of the linking agent relative to the precursor polymers in the above block copolymer production method B is determined so that Wh1 or Wh2 satisfies the range specified above. In this manner, if the midpoint value of the relations of (III) or (IV) above is taken as a guide, then each of block copolymers (ion-conductive polymers) can be produced that has the weight fraction for the segment having an ion-exchange group that satisfies the relations. Furthermore, if the two block copolymers produced are copolymers in which the segment having an ion-exchange group is composed of one or more structural units selected from the group consisting of units (1) to (11) above, and the segment having substantially no ion-exchange groups is composed of one structural units selected from the group consisting of units (12) to (29) above, then the IEC values of the block copolymers will fall within a range of from 0.5 to 4.0 meq/g, meaning the copolymers are also favorable in terms of IEC.

Furthermore, JP-2007-177197-A discloses a method of producing a block copolymer using a precursor polymer that gives rise to a block (segment) having substantially no ion-exchange groups, and a monomer that gives rise to a block (segment) having an ion-exchange group. In this case, two block copolymers (ion-conductive polymers) having the respective midpoint values of the weight fraction ranges represented by (III) and (IV) above as a guide can be produced by controlling the blend weight ratio between the precursor polymer and the monomer.

Even with these block copolymer production methods disclosed in the prior art documents, if the production lot changes, then obtaining ion-conductive polymers having exactly the same weight fraction Wh and IEC value is extremely difficult, but since in the present invention, even if using the ion-conductive polymers having different IEC values, substantially the same properties can be achieved for a fuel cell member, to produce a fuel cell of stable quality, the present invention is extremely valuable from an industrial perspective.

<Method of Producing Polymer Electrolyte Composition>

The polymer electrolyte composition of the present invention is obtained by mixing a plurality of ion-conductive polymers including the two ion-conductive polymers described above. An example of a composition obtained by mixing a plurality of ion-conductive polymers whose copolymerization mode is block copolymerization has been previously suggested in the examples of JP-2005-220193-A, wherein a polymer electrolyte composition with a predetermined ion exchange capacity prepared by mixing together two ion-conductive polymers having ion exchange capacities that differ by at least a factor of 2 provides improved proton conductivity and mechanical strength compared with the case where a single ion-conductive polymer having a similar ion exchange capacity is used. The composition proposed in the above publication is prepared by mixing a specific polyarylene polymer having a large amount of sulfonic acid groups and superior proton conductivity, with a specific polyarylene polymer having a small amount of sulfonic acid groups and exhibiting favorable mechanical properties and toughness, and exhibits secured compatibility between the two polyarylene polymers (see JP-2005-220193-A, paragraph 0123). However, a polymer electrolyte membrane produced from this type of polymer composition tends to be prone to remarkable changes in the microphase-separated structure when the temperature of the operating environment increases or decreases, and if the change is remarkable, then problems tend to arise, including embrittlement of the membrane and a loss of mechanical strength. Accordingly, with this polymer composition, it can be assumed that achieving quality stability for the polymer electrolyte membrane would face considerable hurdles.

The inventors of the present invention postulated that when ion-conductive polymers having remarkably different ion exchange capacities were mixed in this manner, the microphase-separated structure of the polymer electrolyte membrane described below would vary considerably, resulting in variations in the properties such as the proton conductivity. Based on this thinking, the inventors developed the present invention with the aim of enabling stable production of a polymer electrolyte membrane that exhibits certain desired properties.

In order to obtain a fuel cell member such as a polymer electrolyte membrane having certain desired properties by mixing together a plurality of ion-conductive polymers in the manner described above, it can be that the IEC values of each of the used ion-conductive polymers are used as indicators.

First is a description of a method of determining the blend ratio (weight ratio) required for obtaining a fuel cell member having certain desired properties in the case where only the aforementioned first ion-conductive polymer and second ion-conductive polymer are used as the plurality of ion-conductive polymers. It can be that the IEC of the first ion-conductive polymer (hereinafter referred to as "IEC1") and the IEC of the second ion-conductive polymer (hereinafter referred to as "IEC2") are used as indicators.

Specifically, in order to prepare a fuel cell polymer electrolyte having a desired IEC (hereinafter referred to as "IEC0"), if the weight ratio of the first ion-conductive polymer relative to the total weight of ion-conductive polymers is termed C1 and the weight ratio of the second ion-conductive polymer relative to the total weight of ion-conductive polymers is termed C2, then it can be that the following relation is satisfied.

$$IEC0=IEC1 \times C1+IEC2 \times C2 \qquad (V)$$

A polymer electrolyte composition for which the value of the ion exchange capacity IEC0, determined by the above type of simple computational formula (V), satisfies a certain desired value displays substantially the same properties for the resulting fuel cell polymer electrolyte membrane as a polymer electrolyte composition composed of a single ion-conductive polymer and having the same ion exchange capacity IEC0.

Furthermore, in the case where a third ion-conductive polymer is also used in addition to the aforementioned first ion-conductive polymer and second ion-conductive polymer, if the IEC of the third ion-conductive polymer is termed IEC3 and the weight ratio of the third ion-conductive polymer relative to the total weight of ion-conductive polymers is termed C3, then it can be that the relation (V') below is satisfied.

$$IEC0=IEC1 \times C1+IEC2 \times C2+IEC3 \times C3 \qquad (V')$$

In this manner, although another ion-conductive polymer besides the aforementioned first ion-conductive polymer and second ion-conductive polymer may be mixed into the polymer electrolyte composition of the present invention, the blend ratio of that other ion-conductive polymer is preferably less than both the blend ratio of the first ion-conductive polymer and the blend ratio of the second ion-conductive polymer. In a similar manner, if a plurality of other ion-conductive polymers are added, then each of these other ion-conductive polymers preferably has a blend ratio that is less than both the blend ratio of the first ion-conductive polymer and the blend ratio of the second ion-conductive polymer.

In this type of case where a plurality of other ion-conductive polymers are used, the IEC values of each of the ion-conductive polymers can be used as indicators, in a similar manner to that shown in the relation (V').

As described above, although other ion-conductive polymers may be used provided their blend ratio is less than the blend ratio of either of the two ion-conductive polymers, if consideration is given to the fact that calculating the value of IEC0 becomes more complex, and the fact that production of the polymer electrolyte composition itself becomes more cumbersome, then it is preferable that no ion-conductive polymers are used other than the aforementioned two ion-conductive polymers, and it is particularly preferable that no polymers besides the first ion-conductive polymer and the second ion-conductive polymer described above are used as ion-conductive polymers.

The method of producing a polymer electrolyte composition according to the present invention may be any method that includes a step of mixing the two ion-conductive polymers (namely, a mixing step).

In this mixing step, examples of methods that may be used to execute the mixing include (a) a method in which all of the plurality of ion-conductive polymers are prepared in a solid form such as powder, pellets, strands or aggregates, and these solid ion-conductive polymers are mixed together, (b) a method in which, if all of the plurality of ion-conductive polymers can be melted and none of the polymers undergoes thermal degradation when being melted, the polymers are subjected to melt mixing at an appropriate melt temperature, (c) a method in which the plurality of ion-conductive polymers are each dissolved in an appropriate solvent to prepare a series of solutions, and these solutions are then mixed together, and (d) a method in which one of the ion-conductive polymers is dissolved in an appropriate solvent to prepare a solution, and the other ion-conductive polymer(s) are then added to the solution and mixed. Of these methods, methods such as (c) or (d), in which at least one ion-conductive polymer is converted to solution form prior to mixing, are preferred, and in terms of being easy in operation, the method (c) is particularly preferable. The method (c) offers the advantages that mixing can be conducted at approximately room temperature, and production of the polymer electrolyte composition can be completed within a comparatively short period of time. Further, since the polymer electrolyte composition of the present invention will be used for producing a fuel cell member in the manner described below, the polymer electrolyte composition is, in the viewpoint of easiness of the production, preferably prepared in solution form (namely, as a polymer electrolyte solution). Also from this viewpoint, the aforementioned mixing step is preferably performed using the above method (c).

Next is a description of a method of producing a polymer electrolyte membrane from the polymer electrolyte composition of the present invention using a solution casting method. This solution casting method has been widely used conventionally for the production of polymer electrolyte membranes, and particularly is useful in an industrial setting.

The solution casting method is a method in which the polymer electrolyte composition of the present invention is dissolved in an appropriate solvent to prepare a polymer electrolyte solution, this polymer electrolyte solution is cast onto a support substrate such as a glass substrate or a PET (polyethylene terephthalate) film or the like, the solvent is removed to form a polymer electrolyte membrane on the support substrate, and the support substrate is then removed by peeling or the like to complete preparation of the polymer electrolyte membrane. Accordingly, if the polymer electrolyte composition is produced in the form of a polymer electrolyte solution in the manner described above, then this type of solution casting method becomes highly applicable and particularly useful.

As mentioned above, of the plurality of ion-conductive polymers used in the present invention, the aforementioned essential two ion-conductive polymers preferably contain the same structural unit that constitutes the segment having an ion-exchange group and the same structural unit that constitutes the segment having substantially no ion-exchange groups, and therefore the solubilities of these two polymers in solvents relatively approximate to each other. This means that a polymer electrolyte solution can be produced with relatively easily. Furthermore, in addition to ion-conductive polymers, the polymer electrolyte solution can also include additives well-known in the field. Examples of the additives include the types of plasticizers, stabilizers and release agents typically used in polymers, and it is sometimes used inorganic or organic microparticle that is added as water retention agents. If these types of additives are used, then the variety and blend amounts of the additives are preferably selected so that the properties of the resulting polymer electrolyte membrane will not be significantly impaired. Further, the polymer electrolyte solution may also include polymers other than the plurality of ion-conductive polymers. In such cases, these other polymers are preferably selected so that, in the resulting polymer electrolyte membrane, the microphase-separated structure described below will not be significantly impaired.

As the solvent used in preparing the polymer electrolyte solution, a solvent that is capable of dissolving the plurality of ion-conductive polymers, and particularly both of the aforementioned two ion-conductive polymers, is to be selected. Further, if additives are also used, then a solvent that is also capable of dissolving the additives is preferred. Furthermore, the selected solvent should also have a suitable level of volatility or water solubility or the like, so that the solvent can be removed by drying or washing with water. Specific examples of solvents that can be used favorably include aprotic polar solvents such as dimethylformamide (DMF), dimethylacetamide (DMAc), N-methyl-2-pyrrolidone (NMP) and dimethyl sulfoxide (DMSO), chlorine-based solvents such as dichloromethane, chloroform, 1,2-dichloroethane, chlorobenzene and dichlorobenzene, alcohols such as methanol, ethanol and propanol, and alkylene glycol monoalkyl ethers such as ethylene glycol monomethyl ether, ethylene glycol monoethyl ether, propylene glycol monomethyl ether and propylene glycol monoethyl ether. Any one of these solvents may be used individually, or if required, two or more solvents may be used as a solvent mixture. Of the various possibilities, DMSO, DMF, DMAc and NMP exhibit excellent dissolution of the two ion-conductive polymers described above, and are therefore preferred.

Although there are no particular restrictions on the thickness of the polymer electrolyte membrane, the thickness is preferably within a range from 10 to 300 µm. A membrane having a thickness of at least 10 µm provides a superior level of practical strength, and is therefore preferred, whereas a thickness of not more than 300 µm tends to yield a smaller membrane resistance, and is therefore preferred. The thickness of the polymer electrolyte membrane can be controlled by altering the concentration of the polymer electrolyte solution and the thickness of the solution cast onto the substrate.

The polymer electrolyte membrane obtained from the polymer electrolyte composition of the present invention preferably forms a microphase-separated structure that includes a phase in which the density of the segment having an ion-exchange group is higher than the density of the segment having substantially no ion-exchange groups (hereinafter sometimes referred to as the "hydrophilic segment phase") and a phase in which the density of the segment having substantially no ion-exchange groups is higher than the density of the segment having an ion-exchange group (hereinafter sometimes referred to as the "hydrophobic segment phase"), as such structures exhibit a high level of ion conductivity. By using the polymer electrolyte composition of the present invention, even if the production lots of the ion-conductive polymers contained within the polymer electrolyte composition differ, provided that the polymer electrolyte composition is prepared with substantially the same ion exchange capacity IEC by using the aforementioned computational formula (V) or the like, industrial production of a polymer electrolyte membrane having extremely small fluctuations in properties such as the ion conductivity and the water resistance can be achieved even when polymer electrolyte compositions from different production lots are used.

When the microphase-separated structure is viewed using a transmission electron microscope (TEM) or the like, the hydrophilic segment phase (microdomain) and the hydrophobic segment phase (microdomain) coexist, and the domain width of each microdomain structure, namely the identity period, is within a range from several nm to several hundred nm. A structure having microdomain structures for which the identity period is within a range from 5 to 100 nm is preferred.

Furthermore, in order to further improve the strength, flexibility and durability of the membrane, the polymer electrolyte composition of the present invention may be used to impregnate a porous substrate, thereby forming a composite membrane. Conventional methods may be used to form this composite membrane.

There are no particular restrictions on the porous substrate, provided it yields the desired properties listed above, and examples include a porous membrane, woven fabric, nonwoven fabric or fibril, which may be used regardless of shape and regardless of the material used. In terms of the material for the porous substrate, from the viewpoints of heat resistance and reinforcing the physical strength, an aliphatic polymer, an aromatic polymer or a fluoropolymer is preferred.

The polymer electrolyte composition of the present invention may also be complexed with a porous substrate to form a composite membrane. In such cases, the thickness of the porous substrate is preferably within a range from 1 to 100 µm, more preferably from 3 to 30 µm and still more preferably from 5 to 20 µm, the pore size of the porous substrate is preferably within a range from 0.01 to 100 µm and more preferably from 0.02 to 10 µm, and the porosity of the porous substrate is preferably within a range from 20 to 98% and more preferably from 40 to 95%.

Provided the thickness of the porous substrate is at least 1 µm, the strength reinforcing effect achieved following the compositing process, or the reinforcing effect achieved as a result of the imparted flexibility or durability tends to be more superior, and gas leakage (cross leak) becomes very unlikely. Further, provided the thickness is not more than 100 µm, the electrical resistance is lower, and the resulting composite membrane performs better as the ion conducting membrane of a solid polymer fuel cell. A pore size of at least 0.01 µm facilitates the impregnation of the porous substrate with the copolymers of the present invention, whereas a pore size of not more than 100 µm yields a superior reinforcing effect of the copolymers. Provided the porosity is at least 20%, the resistance to ion conduction is reduced, and provided the porosity is not more than 98%, the strength of the porous substrate itself can be ensured, enabling a greater improvement in the reinforcing effect.

By employing the polymer electrolyte composition of the present invention, an aforementioned polymer electrolyte membrane or composite membrane (hereinafter sometimes jointly referred to as a "fuel cell membrane or the like") can be produced with an extremely stable level of quality. The polymer electrolyte composition obtained by selecting a plurality of ion-conductive polymers such that the aforementioned relations (I) and (II), and preferably the relations (I) to (IV), are satisfied, and then mixing the ion-conductive polymers so as to satisfy the above computational formula (V) or (V'), is capable of producing a fuel cell membrane or the like in which the fluctuation in properties between individual membranes is extremely small, even if the ion-conductive polymers incorporated in each of the polymer electrolyte compositions are from different production lots, and therefore the polymer electrolyte composition has an extremely high industrial value.

According to the method of producing an ion-conductive polymer described above, even if the production conditions associated with the production method fluctuate within industrially permissible ranges across different production lots, producing an ion-conductive polymer that satisfies (III) above and an ion-conductive polymer that satisfies (IV) above is still relatively easy. Then, either two, or three or more, of these ion-conductive polymers may be selected so that the relations (I) and (II) will be satisfied.

In the case of a fuel cell membrane or the like obtained from the polymer electrolyte composition of the present invention, even if a series of polymer electrolyte compositions are used that each incorporate ion-conductive polymers from different production lots, the variation in the properties of the obtained fuel cell membrane, for example the variation in the ion conductivity viewed across approximately 10 lots of the fuel cell membrane, remains approximately 10%, meaning industrial production of a fuel cell membrane having an extremely stable quality level can be achieved. Here, the expression "variation in ion conductivity" is ascertained by determining the ion conductivity of a fuel cell membrane from each of approximately 10 lots, calculating the mean value and the standard deviation, and then determining a variation coefficient by dividing the standard deviation by the mean value.
<Fuel Cell>

Next is a description of a fuel cell that employs a fuel cell member obtained from the polymer electrolyte composition of the present invention.

The fuel cell can be produced by bonding a catalyst component and a conductive substance that acts as a current collector to both surfaces of a fuel cell membrane or the like formed from the polymer electrolyte composition of the present invention.

There are no particular restrictions on the catalyst component, provided it is capable of activating the redox reaction of hydrogen or oxygen, and conventional materials can be used, and it is preferable to use microparticles of platinum or a platinum-based alloy as the catalyst component. These microparticles of platinum or a platinum-based alloy are often supported on particulate or fiber-like carbon such as activated carbon or graphite.

Furthermore, the catalyst layer can be obtained by preparing a paste by mixing microparticles of carbon-supported platinum or platinum-based alloy with an alcohol solution containing a polymer electrolyte such as a perfluoroalkylsulfonic acid resin, and then applying this paste to the gas diffusion layer and/or fuel cell membrane and performing drying. A specific example of the method that can be used is the conventional method disclosed in J. Electrochem. Soc., Electrochemical Science and Technology, 1988, 135(9), 2209.

The aforementioned perfluoroalkylsulfonic acid resin used as the polymer electrolyte for producing the catalyst layer may be replaced with the polymer electrolyte composition of the present invention. A catalyst layer obtained using this catalyst composition offers the same advantage as that described above for the polymer electrolyte membrane in that no significant variation in properties occurs as a result of factors such as a change in the production lots of the ion-conductive polymers.

Regarding the conductive substance that acts as a current collector, conventional substances can be used, and a porous carbon woven fabric, carbon non-woven fabric or carbon paper is preferable because they transport efficiently the raw material gases to the catalyst.

A fuel cell of the present invention produced in this manner can be used in all manner of configurations, using hydrogen gas, reformed hydrogen gas or methanol as the fuel.

The present invention is described in further detail below based on a series of examples, but the present invention is in no way limited by these examples. The methods used for measuring the physical properties associated with the present invention are described below.

(Measurement of Ion Exchange Capacity)

The dry weight of the polymer electrolyte membrane to undergo measurement was measured using a halogen moisture analyzer set to a heating temperature of 105° C. Subsequently, the polymer electrolyte membrane was immersed in 5 mL of a 0.1 mol/L aqueous solution of sodium hydroxide, 50 mL of ion-exchanged water was added, and the membrane was left to sit in the solution for 2 hours. Subsequently, a titration was performed by gradually adding 0.1 mol/L hydrochloric acid to the solution in which the polymer electrolyte membrane had been immersed, and the neutralization point was determined. Then, based on the dry weight of the polymer electrolyte membrane and the amount of hydrochloric acid required to achieve neutralization, the ion exchange capacity (units: meq/g) of the polymer electrolyte membrane was calculated.

(GPC Measurement)

By using gel permeation chromatography (GPC) polystyrene-equivalent number average molecular weight (Mn) and weight average molecular weight (Mw) were measured under the conditions described below. The conditions listed below were used for the GPC analysis. One of the solvents listed below was used as the mobile phase solvent (the eluent) for the measurement.

Conditions

GPC measurement apparatus: Prominence GPC System, manufactured by Shimadzu Corporation Column: TSKgel $GMH_{HR-M}$, manufactured by Tosoh Corporation Column temperature: 40° C.

Mobile phase solvent 1: DMF (LiBr was added to yield a concentration of 10 mmol/dm$^3$)

Mobile phase solvent 2: DMAc (LiBr was added to yield a concentration of 10 mmol/dm$^3$)

Solvent flow rate: 0.5 mL/min (Measurement of Water Absorption)

A polymer electrolyte membrane in which substantially all of the cation exchange groups existed as free acid groups was immersed for 2 hours in deionized water at 100° C., and the increase in the weight of the polymer electrolyte membrane compared with the dry weight of the membrane was reported as a percentage relative to the dry weight.

(Measurement of Proton Conductivity)

The membrane resistance was measured using the method disclosed in "Lectures in New Experimental Chemistry 19—Polymer Chemistry (II), page 992 (edited by The Chemical Society of Japan, published by Maruzen Co., Ltd.).

The cell used was made of carbon, and the terminal of the impedance measuring apparatus was connected directly to the cell, without using a platinum black-coated platinum electrode. First, the polymer electrolyte membrane was set in the cell and the resistance was measured, the polymer electrolyte membrane was then removed and the resistance was re-measured, and the membrane resistance was then calculated from the difference between the both. As the solution that was to be contacted with the two sides of the polymer electrolyte membrane, 1 mol/L dilute sulfuric acid was used. Each measurements were conducted in an atmosphere at 23° C. and 50% RH. The proton conductivity was calculated from the membrane thickness when immersed in the dilute sulfuric acid, and the resistance value.

(Measurement of In-Plane Dimensional Change)

Using the values for the in-plane dimension A after the polymer electrolyte membrane had been dried for at least 6 hours in an atmosphere at 23° C. and 50% RH, and the in-plane dimension B after the polymer electrolyte membrane had been immersed for 2 hours in hot water at 80° C., the in-plane dimensional change was calculated using the formula shown below.

$$\text{In-plane dimensional change}=(B-A)/A$$

(Calculation of Weight Fraction of Segment Having an Ion-Exchange Group)

If the IEC of the synthesized polyarylene-based block copolymer was termed A, and the IEC value calculated from the structural unit that constitutes the segment having an ion-exchange group in the polyarylene-based block copolymer was termed B, then the weight fraction of the segment having an ion-exchange group within the polyarylene-based block copolymer was calculated using the formula shown below. The structural unit that constitutes the segment having an ion-exchange group was determined from the raw material that gives rise to the segment having an ion-exchange group in the production of the ion-conductive polymer described below.

Weight fraction $Wh=A/B$

Synthesis Example 1

Referring to the method disclosed in example 7 and example 21 of WO2007/043274 and using Sumikaexcel PES 5200P (manufactured by Sumitomo Chemical Co., Ltd.), a block copolymer 1 (IEC=2.56 meq/g, Mw=416,000, Mn=158,000 [mobile phase solvent 1]) was synthesized composed of a segment having a sulfonic acid group, formed of a structural unit represented by the following formula:

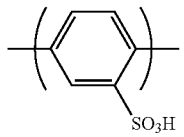

and a segment having no ion-exchange groups, represented by the following formula.

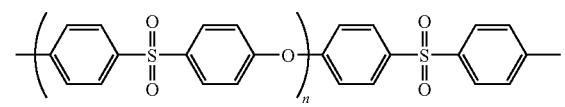

The weight fraction of the segment having an ion-exchange group in this block copolymer 1 was 0.40.

Synthesis Example 2

Using the similar method to that described for synthesis example 1, a block copolymer 2 having a different IEC (IEC=2.27 meq/g, Mw=303,000, Mn=132,000 [mobile phase solvent 1]) was obtained.

The weight fraction of the segment having an ion-exchange group in this block copolymer 2 was 0.35.

Synthesis Example 3

Using the similar method to that described for synthesis example 1, a block copolymer 3 having a different IEC (IEC=2.42 meq/g, Mw=361,000, Mn=143,000 [mobile phase solvent 1]) was obtained.

The weight fraction of the segment having an ion-exchange group in this block copolymer 3 was 0.38.

Synthesis Example 4

Using the similar method to that described for synthesis example 1, a block copolymer 4 having a different IEC (IEC=1.90 meq/g, Mw=120,000, Mn=60,000 [mobile phase solvent 1]) was obtained.

The weight fraction of the segment having an ion-exchange group in this block copolymer 4 was 0.30.

Synthesis Example 5

Synthesis was conducted with referring to the method disclosed in JP-2005-206807-A (example 2 [0059]), yielding a block copolymer 5 shown in the formula below (IEC=1.89 meq/g, Mw=260,000, Mn=50,000 [mobile phase solvent 2]):

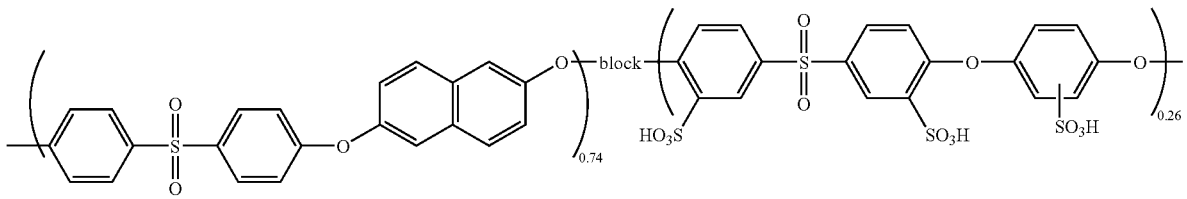

wherein the subscripts appended to the repeating units represent the molar fraction of that particular repeating unit.

The weight fraction of the segment having an ion-exchange group in this block copolymer 5 was 0.36.

Synthesis Example 6

Synthesis was conducted with referring to the method disclosed in JP-2005-206807-A (example 2 [0059]), yielding a block copolymer 6 shown in the formula below (IEC=1.82 meq/g, Mw=240,000, Mn=49,000 [mobile phase solvent 2]):

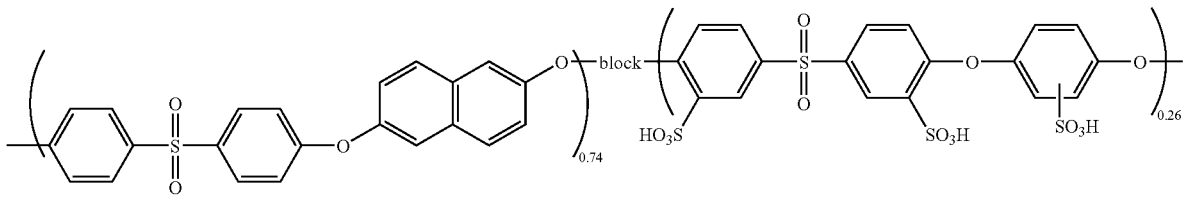

wherein the subscripts appended to the repeating units represent the molar fraction of that particular repeating unit.

The weight fraction of the segment having an ion-exchange group in this block copolymer 6 was 0.34.

(Membrane Production Conditions 1)

Membrane production by casting was conducted using a continuous drying oven. In other words, the polymer electrolyte solution was applied continuously onto a support substrate with the thickness of the applied solution being adjusted to a desired film thickness using a variable thickness doctor blade, and the substrate was then transported continuously into a drying oven to remove the majority of the solvent. The drying conditions employed are listed below.

Drying conditions: temperature 90° C., drying time 33 minutes
(The temperature represents the temperature setting of the drying oven, and the drying time represents the time period from entering the oven until exiting from the oven.)

Following drying, the polymer electrolyte membrane was washed with ion-exchanged water to completely remove any residual solvent. The membrane was then immersed for 2 hours in 2N hydrochloric acid, washed again with ion-exchanged water, and then blown dry, completing preparation of the polymer electrolyte membrane.

Example 1

The polyarylene-based block copolymer 1 obtained in Synthesis Example 1 was dissolved in DMSO to form a solution with a concentration of 8 wt %. Further, the polyarylene-based block copolymer 2 obtained in Synthesis Example 2 was dissolved in DMSO to form a solution with a concentration of 9 wt %. These two solutions were mixed together such that the polymer weight ratio between the block copolymer 1 and the block copolymer 2 would be 35:65, and then using a polyethylene terephthalate film of width of 300 mm and length of 30 m (E5000 grade, manufactured by Toyobo Co., Ltd.) as the support substrate, a polymer electrolyte membrane 1 having a film thickness of approximately 20 μm was prepared under the Membrane Production Conditions 1. The IEC of the thus obtained polymer electrolyte membrane 1 was 2.42 meq/g.

The proton conductivity, the water absorption, and the in-plane dimensional change upon water absorption were measured for the polymer electrolyte membrane 1. The results are shown in Table 2.

Reference Example 1

The polyarylene-based block copolymer 3 obtained in Synthesis Example 3 was dissolved in DMSO to form a solution with a concentration of 9 wt %. Using the thus obtained solution, and using a polyethylene terephthalate film of width of 300 mm and length of 30 m (E5000 grade, manufactured by Toyobo Co., Ltd.) as the support substrate, a polymer electrolyte membrane R1 having a film thickness of approximately 20 μm was prepared under the Membrane Production Conditions 1.

The proton conductivity, the water absorption, and the in-plane dimensional change upon water absorption were measured for the polymer electrolyte membrane R1. The results are shown in Table 2.

Example 2

The block copolymer 4 obtained in Synthesis Example 4 was dissolved in NMP to form a solution with a concentration of 10 wt %. Further, the block copolymer 5 obtained in synthesis example 5 was dissolved in NMP to form a solution with a concentration of 12 wt %. These two solutions were mixed together such that the polymer weight ratio between the block copolymer 4 and the block copolymer 5 would be 25:75, and then using a polyethylene terephthalate film of width of 300 mm and length of 30 m (E5000 grade, manufactured by Toyobo Co., Ltd.) as the support substrate, a polymer electrolyte membrane 2 having a film thickness of approximately 20 μm was prepared under the Membrane Production Conditions 1. The IEC of the thus obtained polymer electrolyte membrane 2 was 1.90 meq/g.

The proton conductivity, the water absorption, and the in-plane dimensional change upon water absorption were measured for the polymer electrolyte membrane 2. The results are shown in Table 2.

Reference Example 2

The block copolymer 6 obtained in Synthesis Example 6 was dissolved in DMSO to form a solution with a concentration of 12 wt %. Using the thus obtained solution, and using a polyethylene terephthalate film of width of 300 mm and length of 30 m (E5000 grade, manufactured by Toyobo Co., Ltd.) as the support substrate, a polymer electrolyte membrane R2 having a film thickness of approximately 20 μm was prepared under the Membrane Production Conditions 1.

The proton conductivity, the water absorption, and the in-plane dimensional change upon water absorption were measured for the polymer electrolyte membrane R2. The results are shown in Table 2.

TABLE 2

| | Wh1 | Wh2 | Proton conductivity (S/cm) | In-plane dimensional change upon water absorption (%) | Water absorption (%) |
|---|---|---|---|---|---|
| Example 1 | 0.40 | 0.35 | 0.10 | 3.9 | 132 |
| Reference Example 1 | 0.38 | | 0.093 | 4.1 | 135 |
| Example 2 | 0.36 | 0.30 | 0.085 | 4.8 | 125 |
| Reference Example 2 | 0.34 | | 0.083 | 5.1 | 130 |

Example 3

As a block copolymer composed of a segment having a sulfonic acid group and a segment having substantially no ion-exchange groups such as that described in Synthesis Example 1, 3 lots of the first ion-conductive polymer and 3 lots of the second ion-conductive polymer are prepared so as to satisfy the above (I) to (IV). Using these two ion-conductive polymers, 9 lots of a polymer electrolyte membrane are produced so as to satisfy the above computational formula (V). For each of these polymer electrolyte membranes, if the proton conductivity, the in-plane dimensional change upon water absorption, and the water absorption are measured, and coefficients of the variation (dispersion) are calculated based on the mean value and the standard deviation for each of the properties, each of the dispersion will be not more than 10%.

Thus, by using the polymer electrolyte composition of the present invention, provided that a plurality of lots of polymer electrolyte composition whose ion exchange capacities are made approximately same as each other by making the above computational formula (V) satisfied, and that fuel cell membranes or the like are produced from the polymer electrolyte compositions, the dispersion in the properties of those can be suppressed to not more than approximately 10%. On the other hand, if approximately 10 lots of the block copolymer 3 from the Reference Example 1 are produced, then even if fluctuations in the blend amounts and the production conditions are kept within industrially permissible ranges, it would result in that the dispersion in the properties of the fuel cell membrane or the like would exceed 10%.

INDUSTRIAL APPLICABILITY

By using the polymer electrolyte composition of the present invention, fuel cell members such as fuel cell polymer electrolyte membranes (hereinafter referred to as "polymer electrolyte membranes") having substantially uniform properties can be produced industrially with a stable quality. For example, when approximately 10 lots of the polymer electrolyte composition of the present invention are prepared, even if ion-conductive polymers incorporated within these polymer electrolyte compositions are from mutually different production lots, fuel cell members such as polymer electrolyte membrane having extremely stable properties can be obtained. Specifically, when polymer electrolyte membranes are produced, the dispersion in the ion conductivity of the membranes would be not more than 10%, indicating extremely stable properties. Not only can the polymer electrolyte composition of the present invention be obtained by an extremely simple method, but the method does not require a complex production technique of selecting ion-conductive polymers having the desired properties from amongst ion-conductive polymers from different production lots, and therefore the polymer electrolyte composition is extremely useful industrially.

The invention claimed is:

1. A polymer electrolyte composition obtained by mixing a plurality of ion-conductive polymers, wherein the ion-conductive polymer that is highest in ion exchange capacity among the plurality of ion-conductive polymers is termed first ion-conductive polymer, and the ion-conductive polymer that is lowest in ion exchange capacity is termed second ion-conductive polymer, then the first ion-conductive polymer and the second ion-conductive polymer are both block copolymers composed of a segment having an ion-exchange group and a segment having substantially no ion-exchange groups, and if the weight fraction of the segment having an ion-exchange group in the first ion-conductive polymer is termed Wh1, and the weight fraction of the segment having an ion-exchange group in the second ion-conductive polymer is termed Wh2, then relations (I) and (II) listed below are satisfied;

$$Wh1 > Wh2 \quad (I)$$

$$Wh1 - Wh2 \leq 0.25. \quad (II)$$

2. The polymer electrolyte composition according to claim 1, wherein relations (III) and (IV) below are satisfied:

$$0.10 \leq Wh1 \leq 0.65 \quad (III)$$

$$0.05 \leq Wh2 \leq 0.55. \quad (IV)$$

3. The polymer electrolyte composition according to claim 1, wherein the segment having an ion-exchange group in the first ion-conductive polymer and the segment having an ion-exchange group in the second ion-conductive polymer are formed of the same structural unit.

4. The polymer electrolyte composition according to claim 1, wherein the segment having substantially no ion-exchange groups in the first ion-conductive polymer and the segment having substantially no ion-exchange groups in the second ion-conductive polymer are formed of the same structural unit.

5. The polymer electrolyte composition according to claim 1, wherein the difference between the ion exchange capacity of the first ion-conductive polymer and the ion exchange capacity of the second ion-conductive polymer is from 0.05 to 1.5 meq/g.

6. The polymer electrolyte composition according to claim 1, wherein the ion exchange capacity of the first ion-conductive polymer and the ion exchange capacity of the second ion-conductive polymer are both within a range of from 0.5 to 4.0 meq/g.

7. The polymer electrolyte composition according to claim 1, wherein a polystyrene-equivalent number average molecular weights of the first ion-conductive polymer and the second ion-conductive polymer, determined by gel permeation chromatography, are termed Mn1 and Mn2 respectively, then Mn1/Mn2 is within a range of from 0.1 to 10.

8. The polymer electrolyte composition according to claim 1, wherein the weight fractions of the first ion-conductive polymer and the second ion-conductive polymer within the polymer electrolyte composition are termed W1 and W2 respectively, then W1/W2 is within a range of from 95/5 to 5/95.

9. The polymer electrolyte composition according to claim 1, wherein the first ion-conductive polymer and/or the second ion-conductive polymer is an aromatic polymer.

10. The polymer electrolyte composition according to claim 1, wherein the segment having an ion-exchange group in the first ion-conductive polymer and/or the segment having an ion-exchange group in the second ion-conductive polymer has an aromatic ring in the main chain of the segment and may further have a side chain containing an aromatic ring, and at least one of the aromatic ring in the main chain or the aromatic ring in the side chain is an aromatic ring to which an ion-exchange group is bonded directly.

11. The polymer electrolyte composition according to claim 1, wherein the first ion-conductive polymer and/or the second ion-conductive polymer is a block copolymer comprising:

a segment having an ion-exchange group represented by formula (1a), formula (2a), formula (3a) or formula (4a) below:

(1a)

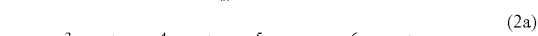

(2a)

(3a)

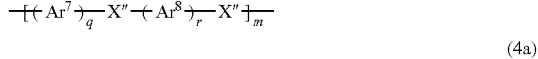

(4a)

wherein m represents an integer of 5 or greater, $Ar^1$ to $Ar^9$ each independently represents a divalent aromatic group which has an aromatic ring in the main chain and may further have a side chain containing an aromatic ring, and in which an ion-exchange group is bonded directly to at least one of the aromatic ring in the main chain or the aromatic ring in the side chain, Z and Z' each independently represents CO or $SO_2$, X, X' and X" each independently represents O or S, Y represents a direct bond or a group represented by formula (10) below, p represents 0, 1 or 2, q and r each independently represents 1, 2 or 3, and m represents a polymerization degree of the segment, and a segment having substantially no ion-exchange groups represented by formula (1b), formula (2b), formula (3b) or formula (4b) below:

$$\mathrm{-\!\!+\!Ar^{11}\!-\!Z\!-\!Ar^{12}\!-\!X\!+\!\!-}\quad(1b)$$

$$\mathrm{-\!\!+\!Ar^{13}\!-\!Z'\!-\!Ar^{14}\!-\!X'\!-\!Ar^{15}\!-\!(Y\!-\!Ar^{16})_{p'}\!-\!X'\!+\!\!-}\quad(2b)$$

$$\mathrm{-\!\!+\!(Ar^{17})_{q'}\!-\!X''\!-\!(Ar^{18})_{r'}\!-\!X''\!+\!\!-}\quad(3b)$$

$$\mathrm{-\!\!+\!Ar^{19}\!+\!\!-}\quad(4b)$$

wherein n represents an integer of 5 or greater, $Ar1^1$ to $Ar1^9$ each independently represents a divalent aromatic group that may have a substituent as a side chain, Z and Z' each independently represents CO or $SO_2$, X, X' and X" each independently represents O or S, Y represents a direct bond or a group represented by formula (10) below, p' represents 0, 1 or 2, and q' and r' each independently represents 1, 2 or 3,

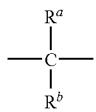

(10)

wherein $R^a$ and $R^b$ each independently represents a hydrogen atom, an alkyl group of 1 to 10 carbon atoms that may have a substituent, an alkoxy group of 1 to 10 carbon atoms that may have a substituent, an aryl group of 6 to 18 carbon atoms that may have a substituent, an aryloxy group of 6 to 18 carbon atoms that may have a substituent, or an acyl group of 2 to 20 carbon atoms that may have a substituent; and Ra and Rb may be linked to form a ring.

12. The polymer electrolyte composition according to claim 1, wherein the ion-exchange group being within the first ion-conductive polymer and/or the second ion-conductive polymer is a sulfonic acid group.

13. A polymer electrolyte membrane, formed from the polymer electrolyte composition according to claim 1.

14. The polymer electrolyte membrane according to claim 13, having a microphase-separated structure comprising a phase in which the density of the segment having an ion-exchange group is higher than the density of the segment having substantially no ion-exchange groups, and a phase in which the density of the segment having substantially no ion-exchange groups is higher than the density of the segment having an ion-exchange group.

15. A membrane-electrode assembly, comprising the polymer electrolyte membrane according to claim 13.

16. A catalyst layer, formed from the polymer electrolyte composition according to claim 1.

17. A membrane-electrode assembly, comprising the catalyst layer according to claim 16.

18. A solid polymer fuel cell, comprising the membrane-electrode assembly according to claim 15.

* * * * *

UNITED STATES PATENT AND TRADEMARK OFFICE
CERTIFICATE OF CORRECTION

PATENT NO.       : 8,273,500 B2
APPLICATION NO.  : 12/680119
DATED            : September 25, 2012
INVENTOR(S)      : Yasuhiro Yamashita, Daizaburo Yashiki and Mitsunori Nodono Page 1 of 1

It is certified that error appears in the above-identified patent and that said Letters Patent is hereby corrected as shown below:

Delete, on the title page item:
"(75) Inventors: Yasuhiro Yamashita, Tsukuba (JP);
 Diazaburo Yashiki, Niihama (JP)
 Mitsunori Nodono, Tsukuba (JP)"

Insert
--(75) Inventors: Yasuhiro Yamashita, Tsukuba (JP);
 Daizaburo Yashiki, Niihama (JP);
 Mitsunori Nodono, Tsukuba (JP)--

Signed and Sealed this
Thirteenth Day of November, 2012

David J. Kappos
*Director of the United States Patent and Trademark Office*